United States Patent
Nakayama (10) Patent No.: US 10,295,142 B2
(45) Date of Patent: May 21, 2019

(54) VEHICLE LAMP (71) Applicant: KOITO MANUFACTURING CO., LTD., Tokyo (JP)

(72) Inventor: Daisuke Nakayama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/750,442

(22) PCT Filed: Jul. 21, 2016

(86) PCT No.: PCT/JP2016/071439
§ 371 (c)(1),
(2) Date: Feb. 5, 2018

(87) PCT Pub. No.: WO2017/022507
PCT Pub. Date: Feb. 9, 2017

(65) Prior Publication Data
US 2018/0224083 A1 Aug. 9, 2018

(30) Foreign Application Priority Data

Aug. 4, 2015 (JP) .................................. 2015-154257

(51) Int. Cl.
*F21V 9/00* (2018.01)
*F21S 43/241* (2018.01)
(Continued)

(52) U.S. Cl.
CPC .......... *F21S 43/241* (2018.01); *B60Q 1/0041* (2013.01); *B60Q 1/32* (2013.01);
(Continued)

(58) Field of Classification Search
CPC ...... B60Q 1/00; B60Q 1/0029; B60Q 1/0041; B60Q 1/32; B60Q 1/44; F21S 43/14;
(Continued)

(56) References Cited

FOREIGN PATENT DOCUMENTS

JP          3146553 U      11/2008
JP       2014-157804 A      8/2014
(Continued)

OTHER PUBLICATIONS

International Search Report issued in PCT/JP2016/071439 dated Sep. 20, 2016 (5 pages).
(Continued)

*Primary Examiner* — Jason M Han
(74) *Attorney, Agent, or Firm* — Osha Liang LLP (57) ABSTRACT

A light-transmitting member is arranged such that light emitted from a light guide enters. Light which enters an incident end surface is emitted from an emitting end surface. The light-transmitting member has a wide width portion and a narrow width portion. A width of the incident end surface of the wide width portion is larger than a width of the light guide in a direction perpendicular to a longitudinal direction of the light guide. A width of the incident end surface of the narrow width portion is smaller than the width of the incident end surface of the wide width portion. The incident end surface has a curved surface convex toward the light guide at least in the wide width portion. A curvature of the incident end surface in the wide width portion is greater than a curvature of the incident end surface in the narrow width portion.

6 Claims, 4 Drawing Sheets (51) Int. Cl.
*F21S 43/242* (2018.01)
*B60Q 1/32* (2006.01)
*B60Q 1/44* (2006.01)
*B60Q 1/00* (2006.01)
*F21S 43/14* (2018.01)
*F21S 43/237* (2018.01)
*F21S 43/243* (2018.01)
*F21S 43/247* (2018.01)
*F21S 43/251* (2018.01)
*F21Y 115/10* (2016.01)
*F21W 103/35* (2018.01)
*F21W 103/15* (2018.01)
*F21W 103/10* (2018.01)

(52) U.S. Cl.
CPC ............... *B60Q 1/44* (2013.01); *F21S 43/14* (2018.01); *F21S 43/237* (2018.01); *F21S 43/242* (2018.01); *F21S 43/243* (2018.01); *F21S 43/247* (2018.01); *F21S 43/251* (2018.01); *F21W 2103/10* (2018.01); *F21W 2103/15* (2018.01); *F21W 2103/35* (2018.01); *F21Y 2115/10* (2016.08)

(58) Field of Classification Search
CPC ...... F21S 43/235; F21S 43/236; F21S 43/237; F21S 43/241; F21S 43/242; F21S 43/243; F21S 43/249; F21S 43/251
USPC ........................................................ 362/511
See application file for complete search history.

(56) References Cited

FOREIGN PATENT DOCUMENTS

| | | |
|---|---|---|
| JP | 2014-235819 A | 12/2014 |
| JP | 2015-082443 A | 4/2015 |

OTHER PUBLICATIONS

Written Opinion of the International Searching Authority issued in PCT/JP2016/071439 dated Sep. 20, 2016 (3 pages).

VEHICLE LAMP

BACKGROUND

Technical Field

The present invention relates to a vehicle lamp including a light guide and a light-transmitting member.

Related Art

In vehicle lamps such as tail lamps and clearance lamps, configurations which include a light guide are known.

A vehicle lamp described in Japanese Patent Application Publication No. 2014-235819 includes such a light guide and a light-transmitting member.

The light guide of the vehicle lamp disclosed in Japanese Patent Application Publication No. 2014-235819 has an incident surface and an emitting surface and is elongated so as to define a longitudinal direction. The light guide is disposed such that light emitted from a light source enters the incident surface. The light guide is configured such that light entering the incident surface is emitted from the emitting surface while being guided along the longitudinal direction.

Further, the light-transmitting member disclosed in Patent Document 1 has an incident end surface and an emitting end surface. The light-transmitting member is arranged such that light emitted from the emitting surface of the light guide enters the incident end surface of the light-transmitting member. The light-transmitting member is configured such that light which enters the incident end surface is emitted from the emitting end surface.

SUMMARY OF THE INVENTION

In the vehicle lamp described in Japanese Patent Application Publication No. 2014-235819, the light-transmitting member extends in the longitudinal direction of the light guide with a substantially constant cross-sectional shape. The width of the incident end surface of the light-transmitting member in a direction perpendicular to the longitudinal direction is substantially the same as the width of the light guide. In this case, it may be relatively easy to cause emitting from the emitting end surface of the light-transmitting member in a substantially uniform manner. However, depending on the configuration of the light-transmitting member, it may be sometimes difficult to cause a substantially uniform emission from the emitting end surface.

For example, when the width of the incident end surface of the light-transmitting member in the direction perpendicular to the longitudinal direction varies depending on the position along the longitudinal direction, the path of light which enters the light-transmitting member varies along the longitudinal direction, and it is sometimes difficult to emit light substantially uniformly from the emitting end surface.

Accordingly, in a vehicle lamp including a light guide, which is elongated so as to define a longitudinal direction, and a light-transmitting member, causing the emitting end surface to substantially uniformly emit light when the width of the emitting end surface of the light-transmitting member in the direction perpendicular to the longitudinal direction varies depending on the position along the longitudinal direction.

According to an aspect of the present invention, there is provided a lamp to be mounted on a vehicle, the lamp including a light source; a light guide having an incident surface and an emitting surface, and being elongated to define a longitudinal direction; and a light-transmitting member having an incident end surface and an emitting end surface, and extending along the longitudinal direction, wherein the light guide is arranged such that light emitted from the light source enters the incident surface, wherein the light guide is configured such that the light entering the incident surface is guided along the longitudinal direction and emitted from the emitting surface, wherein the light-transmitting member is arranged such that light emitted from the emitting surface of the light guide enters the incident end surface of the light-transmitting member, wherein the light-transmitting member is configured such that light which enters the incident end surface is emitted from the emitting end surface, wherein the light-transmitting member has a wide width portion and a narrow width portion, wherein a width of the incident end surface of the wide width portion is larger than a width of the light guide in a direction perpendicular to the longitudinal direction, wherein a width of the incident end surface of the narrow width portion is smaller than the width of the incident end surface in the wide width portion in the direction perpendicular to the longitudinal direction, wherein the incident end surface has a curved surface which is convex toward the light guide at least in the wide width portion, and wherein a curvature of the incident end surface in the wide width portion is larger than a curvature of the incident end surface in the narrow width portion.

The type of "light source" is not particularly limited and, for example, a light-emitting diode, a laser diode, or the like can be adopted.

The specific direction of the "longitudinal direction" is not particularly limited.

In the "light-transmitting member", the width of the incident end surface in the direction perpendicular to the longitudinal direction changes depending on the position in the longitudinal direction, and the manner of this change may be continuous or stepwise.

The specific amount of the curvature is not particularly limited as long as the curvature of the "incident end surface in the wide width portion" is larger than the curvature of the incident end surface of the narrow width portion.

The "incident end surface of the narrow width portion" may be a curved surface which is convex toward the light-transmitting member or may be a flat surface.

The above vehicle lamp includes the light source, the light guide, and the light-transmitting member. The light guide has the incident surface and the emitting surface, and is elongated to define the longitudinal direction. The light-transmitting member has the incident end surface and the emitting end surface and extends in the longitudinal direction. The light guide is arranged such that light emitted from the light source enters the incident surface. The light guide is configured such that light entering the incident surface is guided along the longitudinal direction and emitted from the emitting surface. The light-transmitting member is arranged such that light emitted from the emitting surface of the light guide enters the incident end surface of the light-transmitting member. The light-transmitting member is configured such that light which enters from the incident end surface is emitted from the emitting end surface. As a result, the emitting end surface of the light-transmitting member appears bright.

The light-transmitting member has the wide portion and the narrow portion. The width of the incident end surface of the wide width portion is larger than the width of the light guide in the direction perpendicular to the longitudinal direction. The width of the incident end surface of the narrow width portion is smaller than the width of the incident end surface of the wide width portion in the direction perpendicular to the longitudinal direction. The incident end surface has a curved surface which is convex toward the light guide at least in the wide width portion. The curvature of the incident end surface in the wide width portion is greater than the curvature of the incident end surface in the narrow width portion.

In this case, light which reaches the emitting end surface after being emitted from the light guide and entering the light-transmitting member includes light which enters from the incident end surface and directly reaches the emitting end surface and light which reaches the emitting end surface after entering from the incident end surface and being totally reflected by end surfaces other than the emitting end face.

Since the incident end surface of the narrow width portion has a relatively small curvature, much of the light which enters from the incident end surface of the narrow width portion reaches the emitting end surface directly and the remaining light is totally reflected at large incident angles by end surfaces other than the emitting end surface, so that light emitted from the emitting end surface of the light-transmitting member travels in a direction close to the front-rear direction of the vehicle lamp. Consequently, the emitting end surface of the narrow width portion appears bright in a substantially uniform manner.

On the other hand, assuming that the incident end surface of the wide width portion has a relatively small curvature, light which enters from the incident end surface of the wide width portion and does not directly reach the emitting end surface is totally reflected at relatively small incident angles by the end surfaces other than the emitting end surface. As a result, light emitted from the emitting end surface of the light-transmitting member travels in a direction inclined to some extent with respect to the front-rear direction of the vehicle lamp. Consequently, it is difficult to make the emitting end surface of the wide width portion emit light in substantially uniform manner.

In the vehicle lamp described above, since the incident end surface of the wide width portion has a greater curvature than the incident end surface of the narrow width portion, the proportion of light reaching the end surfaces other than the emitting end surface after entering from the incident end surface of the wide width portion is reduced. Further, light reaching such end surfaces is totally reflected at relatively large incident angles. Thus, most of the light emitted from the emitting end surface of the light-transmitting member is made to travel in a direction close to the front-rear direction of the vehicle lamp. Consequently, the emitting end surface of the wide width portion also appears bright in a substantially uniform manner.

Therefore, in the vehicle lamp including the light guide, which is elongated to define the longitudinal direction, and the light-transmitting member, the emitting end surface can be made to emit light in a substantially uniform manner even when the width of the incident end surface of the light-transmitting member in the direction perpendicular to the longitudinal direction varies depending on the position in the longitudinal direction.

The above-described vehicle lamp may be configured as follows. The wide width portion is disposed upstream of the narrow width portion in a direction in which light entering the incident surface is guided.

The amount of light from the light guide which enters the light-transmitting member becomes relatively large on the upstream side in the light guiding direction. According to the above configuration, since the wide width portion of the light-transmitting member is disposed upstream of the narrow width portion in the light guiding direction, the emitting end surface of the wide width portion can be made to appear bright in a substantially uniform manner with the same brightness as the emitting end surface of the narrow portion.

The above-described vehicle lamp may be configured as follows. The incident end surface of the narrow portion is flat.

In the case where the incident end surface of the transmitting member is a convex curved surface, if the positions of the light-transmitting member and the light guide are displaced in the direction perpendicular to the longitudinal direction, it becomes difficult to control light distribution with the light-transmitting member in a desired manner. In this case, even with the same displacement in width, the influence on light distribution control is larger in the narrow width portion than in the wide width portion.

However, by adopting a configuration in which the incident end surface of the narrow width portion is flat, even when a displacement of the light-transmitting member and the light guide occurs as described above, the influence on light distribution control can be suppressed effectively. In particular, since displacement occurs more likely between the narrow width portion located downstream in the light guiding direction and the light guide, it is effective to adopt such a configuration.

The above-described vehicle lamp may be configured as follows: The light-transmitting member has an end surface disposed between the incident end surface and the emitting end surface, and the end surface has a light diffusing portion.

With such a configuration, the light diffusing portion provided to the end surface can control the influence to the light distribution, although the light diffusing portion is provided for the designing purpose (for example, in order to prevent the light guide from being seen through the transparent member).

The above-described vehicle lamp may be configured as follows: The light guide extends such that its inclination angle with respect to a left-right direction of the vehicle changes, and the wide width portion is disposed at a position in which the inclination angle is larger.

When there is a displacement between the light-transmitting member and the light guide in the direction perpendicular to the longitudinal direction, the direction of light emitted from the light-transmitting member approaches a horizontal direction. Since the light distribution pattern formed by the vehicle lamp generally diffuses more in the horizontal direction than in the vertical direction, the effect of directional displacement is relatively small if the displacement of the emitted light occurs in the horizontal direction. Consequently, according to the above configuration, the effect of directional displacement on the light distribution of the vehicle lamp can be suppressed.

The above-described vehicle lamp may be configured as follows: The distance between the incident end surface and the emitting end surface is 1 to 5 times the width of the incident end surface in the direction perpendicular to the longitudinal direction.

By making the distance between the incident end surface and the emitting end surface of the light-transmitting member relatively short, light totally reflected by the other end surfaces located between the incident end surface and the emitting end surface in the light-transmitting member can be made to reach the positions close to the other end surfaces around the emitting end surface. In this way, the entire emitting end surface can be made to emit light in a substantially uniform manner. More preferably, the distance between the incident end surface and the emitting end surface is less than or equal to three times the width of the incident end surface in the direction perpendicular to the longitudinal direction.

DETAILED DESCRIPTION

Hereinafter, embodiments of the present invention will be described in detail with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
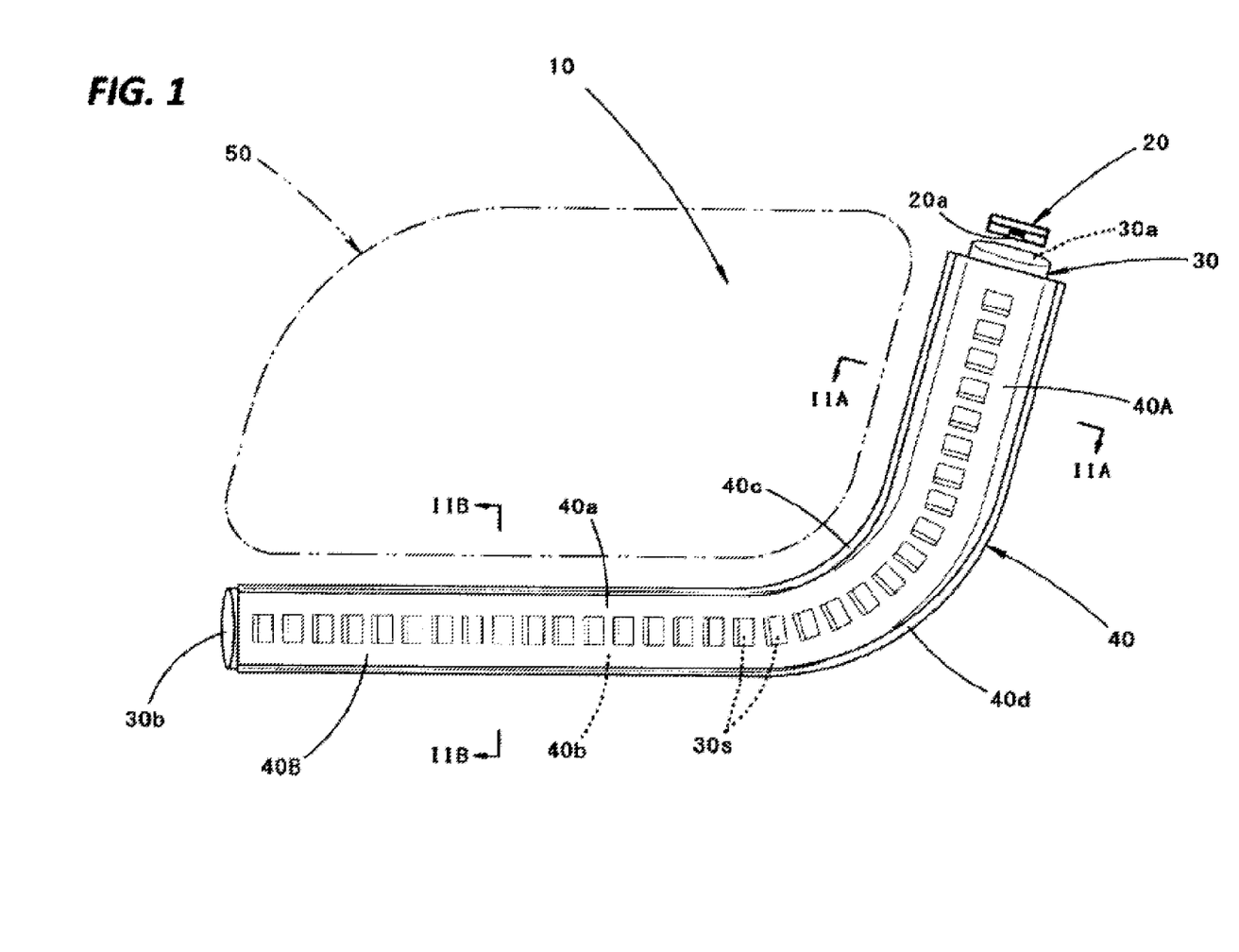
FIG. 1 is a front view illustrating a vehicle lamp according to an embodiment of the present invention.
Figure 2A:
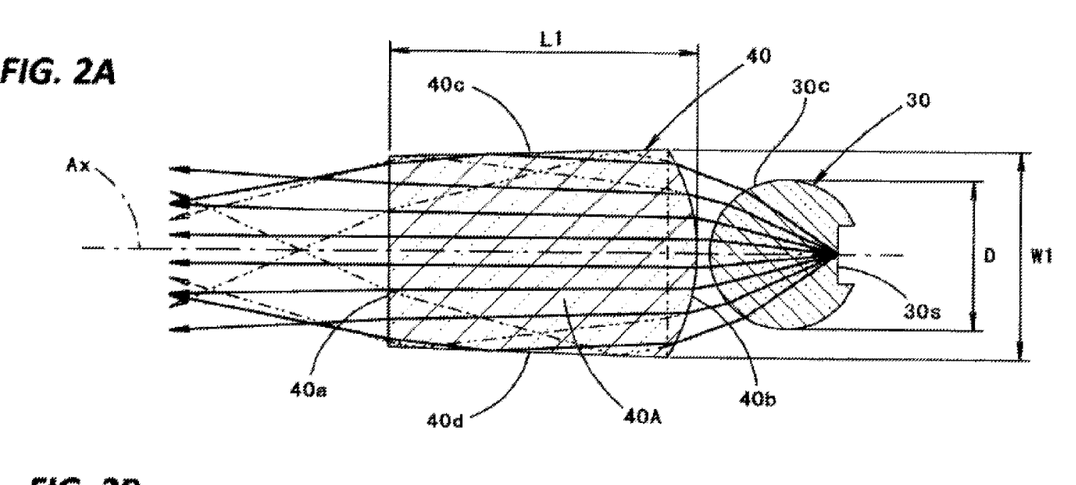
FIG. 2A is a view illustrating a cross section taken along the IIA-IIA line in FIG. 1 as viewed in the arrow direction.
Figure 2B:
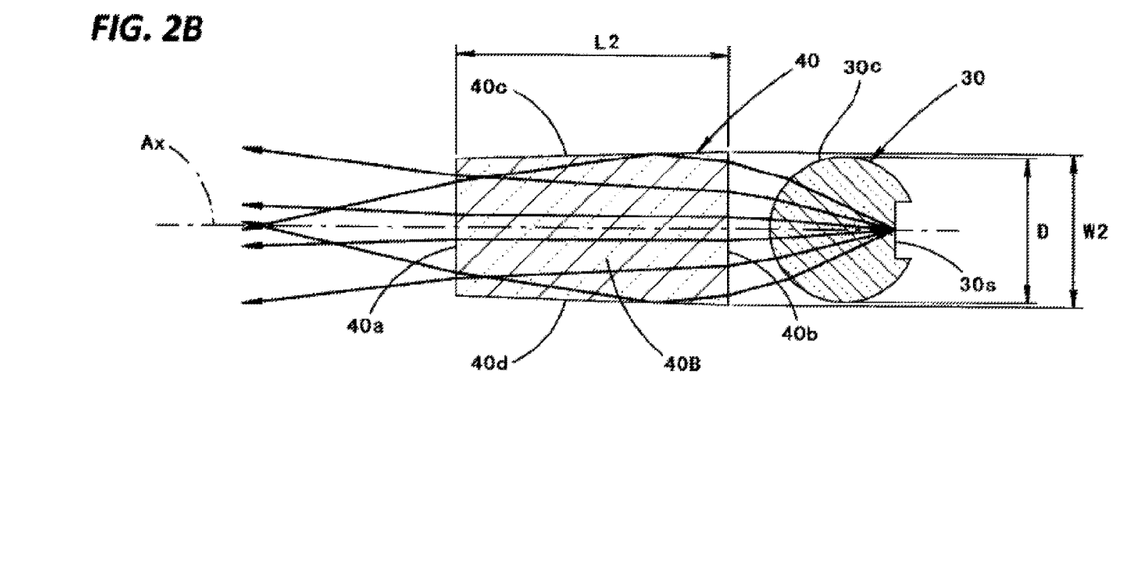
FIG. 2B is a view illustrating a cross section taken along the IIB-IIB line in FIG. 1 as viewed in the arrow direction.

FIG. 1 is a front view illustrating a vehicle lamp 10 according to an embodiment of the present invention. FIG. 2A is a view illustrating a cross section taken along the IIA-IIA line in FIG. 1 as viewed in the arrow direction, and FIG. 2B is a view illustrating a cross section taken along the IIB-IIB line in FIG. 1 as viewed in the arrow direction.

The vehicle lamp 10 according to the present embodiment is a clearance lamp provided at a left front end portion of a vehicle. As shown in FIG. 1, the vehicle lamp 10 and a head lamp unit 50 are housed in a lamp room formed by a lamp body and a light-transmitting cover which are not shown.

The vehicle lamp 10 includes a light source 20, a light guide 30 (an example of a light guide), and a light-transmitting member 40. The vehicle lamp 10 is supported by the lamp body.

The light guide 30 is a transparent synthetic resin molded article made of acrylic resin or the like. The light guide 30 is a columnar member which is elongated so as to define a longitudinal direction.

The light guide 30 extends to curve along an outer shape of the head lamp unit 50. Specifically, the light guide 30 has a left end surface 30a and a right end surface 30b. When the vehicle lamp 10 is viewed from the front, the left end surface 30a is positioned on the outer side in the vehicle width direction (i.e. the right end), and the right end surface 30b is located on the inner side in the vehicle width direction (i.e. the left end). The light guide 30 extends in a substantially horizontal direction from the right end surface 30b toward the outer side in the vehicle width direction and curves upward from the middle and extends obliquely upward and rearward to the left end surface 30a at an angle close to a vertical direction.

The light source 20 can be, for example, a white light-emitting diode. The light source 20 is disposed such that a light-emitting surface 20a faces the left end surface 30a of the light guide 30 (that is, the light source 20 is directed obliquely downward and forward). The light guide 30 is arranged such that light emitted from the light-emitting surface 20a of the light source 20 enters from the left end surface 30a (an example of an incident surface).

The light guide 30 has a circular cross-sectional shape in a direction perpendicular to the longitudinal direction. A rear face portion of the light guide 30 is formed with a plurality of reflecting elements 30s recessed from the rear face portion. The plurality of reflecting elements 30s are arranged at substantially equal intervals along the longitudinal direction.

Light entering from the left end surface 30a is internally reflected by the plurality of reflecting elements 30s while being guided along the longitudinal direction of the light guide 30. Internally reflected light is emitted in the forward direction from a front face portion 30c (an example of an emitting surface) of the light guide 30.

The light-transmitting member 40 is a transparent synthetic resin molded article made of an acrylic resin or the like. The light-transmitting member 40 is disposed in front of the light guide 30. The light-transmitting member 40 is a member which is elongated along the longitudinal direction of the light guide 30.

The cross-sectional shape of the light-transmitting member 40 in the direction perpendicular to the longitudinal direction is substantially rectangular. The light-transmitting member 40 has an emitting end surface 40a and an incident end surface 40b. The emitting end surface 40a constitutes the front end face of the light-transmitting member 40. The incident end surface 40b constitutes the rear end face of the light-transmitting member 40. The light-transmitting member 40 has an inner surface 40c (an example of an end surface) and an outer surface 40d (an example of an end surface). The inner surface 40c and the outer surface 40d are both located between the emitting end surface 40a and the incident end surface 40b. The inner surface 40c is disposed closer to the head lamp unit 50 than the outer surface 40d. The distance between the inner surface 40c and the outer surface 40d becomes slightly smaller as approaching to the emitting end surface 40a from the incident end surface 40b.

In the light-transmitting member 40, the width of the incident end surface 40b in the direction perpendicular to the longitudinal direction varies depending on the position in the longitudinal direction.

Specifically, as shown in FIGS. 2A and 2B, the light-transmitting member 40 has a wide width portion 40A and a narrow width portion 40B. In the wide width portion 40A, a width W1 of the incident end surface 40b in the direction perpendicular to the longitudinal direction is larger than the width (i.e. the diameter) D of the light guide 30 in the same direction. A width W2 of the narrow width portion 40B in the direction perpendicular to the longitudinal direction is smaller than the width W1 of the wide width portion 40A in the same direction. Specifically, the width W1 of the incident end surface 40b of the wide width portion 40A is about 1.3 to 2 times the width D of the light guide 30. The width W2 of the incident end surface 40b of the narrow width portion 40B is about 0.8 to 1.2 times the width D of the light guide 30.

The wide width portion 40A is positioned so as to face a portion of the light guide 30 near the left end surface 30a (i.e. a portion extending at an angle close to the vertical direction). The narrow width portion 40B is positioned so as to face a portion of the light guide 30 near the right end surface 30b (i.e. a portion extending in a substantially horizontal direction). In a curved portion between the wide width portion 40A and the narrow width portion 40B, the width of the incident end surface 40b in the direction perpendicular to the longitudinal direction gradually changes from the wide width portion 40A to the narrow width portion 40B.

In the wide width portion 40A, a length L1 of the light-transmitting member 40 in the front-rear direction (that is, the distance between the incident end surface 40b and the emitting end surface 40a) is about 1 to 5 times (more preferably about 1 to 3 times) the width W1 of the incident end surface 40b.

In the narrow width portion 40B, a length L2 of the light-transmitting member 40 in the front-rear direction (that is, the distance between the incident end surface 40b and the emitting end surface 40a) is about 1 to 5 times (more preferably 1 to 3 times) the width W2 of the incident end surface 40b.

The emitting end surface 40a of the light-transmitting member 40 is flat over the entire region in the longitudinal direction.

The incident end surface 40b of the light-transmitting member 40 is a curved surface which is convex toward the light guide 30 in the wide width portion 40A and flat in the narrow width portion 40B.

As shown in FIG. 2B, light emitted from the light guide 30, which enters the narrow width portion 40B from the incident end surface 40b of the light-transmitting member 40, is refracted so as to approach an axis Ax which extends in the front-rear direction to pass through the center of the cross section of the light guide 30.

Light emitted from the light guide 30 at a relatively small opening angle with respect to the axis Ax enters the narrow width portion 40B and then directly reaches the emitting end surface 40a. The light is then emitted from the emitting end surface 40a in the forward direction with a relatively small opening angle with respect to the axis Ax.

On the other hand, light emitted from the light guide 30 at a relatively large opening angle with respect to the axis Ax is totally reflected by the inner surface 40c and the outer surface 40d after entering the narrow width portion 40B and reaches the emitting end surface 40a. Since the incident reflection angle with respect to the inner surface 40c and the outer surface 40d is considerably large (nearly 90°, respectively), the opening angle becomes relatively small with respect to the axis Ax when the totally reflected light is emitted from the emitting end surface 40a.

Therefore, when the light-transmitting member 40 is observed from the front of the lamp, the entire narrow width portion 40B appears bright in a substantially uniform manner.

As shown in FIG. 2A, light emitted from the light guide 30 and entering the wide width portion 40A from the incident end surface 40b of the light-transmitting member 40 is highly refracted in a direction which approaches the axis Ax since the incident end surface 40b has a curved surface which is convex toward the light guide 30.

Light emitted from the light guide 30 at a relatively small opening angle with respect to the axis Ax enters the wide width portion 40A and then directly reaches the emitting end surface 40a. The light is then emitted from the emitting end surface 40a in the forward direction with a relatively small opening angle with respect to the axis Ax.

On the other hand, light emitted from the light guide 30 at a relatively large opening angle with respect to the axis Ax is totally reflected by the inner surface 40c and the outer surface 40d after entering the wide width portion 40A and reaches the emitting end surface 40a. Since the incident reflection angle with respect to the inner surface 40c and the outer surface 40d is considerably large (nearly 90°, respectively), the opening angle becomes relatively small with respect to the axis Ax when the totally reflected light is emitted from the emitting end surface 40a.

Therefore, when the light-transmitting member 40 is observed from the front of the lamp, the entire wide width portion 40A appears bright in a substantially uniform manner.

As a comparative example, as shown by a two-dot dashed line in FIG. 2A, a case where the incident end surface 40b of the wide width portion 40A is flat will be considered. In this case, although the light emitted from the light guide 30 and entering the wide width portion 40A from the incident end surface 40b of the light-transmitting member 40 is refracted in a direction which approaches the axis Ax, the refraction angle is considerably small compared to the case where the incident end surface 40b of the wide width portion 40A is a curved surface which is convex toward the light guide 30. Therefore, the light emitted from the light guide 30 at a relatively large opening angle with respect to the axis Ax is totally reflected by the inner surface 40c and the outer surface 40d after entering the wide width portion 40A and reaches the emitting end surface 40a. However, the incident and reflection angles with respect to the inner surface 40c and the outer surface 40d are considerably small compared with the case where the incident end surface 40b of the wide width portion 40A is a curved surface which is convex toward the light guide 30. Therefore, the opening angle with respect to the axis Ax when the light which is totally reflected by the inner surface 40c and the outer surface 40d is emitted from the emitting end surface 40a is considerably large.

Therefore, when observing the light-transmitting member 40 from the front of the lamp, a portion close to the inner surface 40c and the outer surface 40d of the wide width portion 40A appears somewhat dark.

Next, the operation and effect of the present embodiment will be described.

The vehicle lamp 10 according to the present embodiment includes a light source 20, a light guide 30, and a light-transmitting member 40. The light guide 30 has a left end surface 30a and a front face portion 30c and is elongated so as to define a longitudinal direction. The light-transmitting member 40 has an incident end surface 40b and an emitting end surface 40a and extends in the longitudinal direction. The light guide 30 is arranged such that light emitted from the light source 20 enters the left end surface 30a. The light guide 30 is configured such that light entering from the left end surface 30a is guided along the longitudinal direction and emitted from the front face portion 30c. The light-transmitting member 40 is arranged such that light emitted from the front face portion 30c enters the incident end surface 40b. The light-transmitting member 40 is configured such that light entering from the incident end surface 40b is emitted from the emitting end surface 40a. As a result, the emitting end surface 40a of the light-transmitting member 40 appears bright.

The light-transmitting member 40 has a wide width portion 40A and a narrow width portion 40B. The width of the incident end surface 40b in the direction perpendicular to the longitudinal direction of the wide width portion 40A is larger than the width of the light guide 30 in the same direction. The width of the incident end surface 40b in the direction perpendicular to the longitudinal direction of the narrow width portion 40B is smaller than the width of the incident end surface 40b of the wide width portion 40A in the same direction. The incident end surface 40*b* has a curved surface which is convex toward the light guide 30 at least in the wide width portion 40A. The curvature of the incident end surface 40*b* in the wide width portion 40A is larger than the curvature of the incident end surface 40*b* in the narrow width portion 40B.

In this case, light emitted from the light guide 30, which enters the light-transmitting member and reaches the emitting end surface 40*a*, includes light which enters from the incident end surface 40*b* and directly reaches the emitting end surface 40*a*, and light which enters from the incident end surface 40*b* and reaches the emitting end surface 40*a* after being totally reflected by the end surfaces other than the emitting end surface 40*a*.

Since the incident end surface 40*b* of the narrow width portion 40B has a relatively small curvature, most of the light entering from the incident end surface 40*b* of the narrow width portion 40B directly reaches the emitting end surface 40*a* and, since other light is totally reflected at large incident angles by the end surfaces other than the emitting end surface 40*a*, the light emitted from the emitting end surface 40*a* of the light-transmitting member 40 is eventually projected in a direction close to the front-rear direction of the vehicle lamp 10. Consequently, the emitting end surface 40*a* of the narrow width portion 40B appears bright in a substantially uniform manner.

On the other hand, assuming that the incident end surface 40*b* of the wide width portion 40A has a relatively small curvature, light which enters from the incident end surface 40*b* of the wide width portion 40A and does not directly reach the emitting end surface 40*a* is totally reflected at relatively small incident angles by the end surfaces other than the emitting end surface 40*a*. As a result, light emitted from the emitting end surface 40*a* of the light-transmitting member 40 is projected in a direction inclined to some extent with respect to the front-rear direction of the vehicle lamp 10. Consequently, it is difficult to make the emitting end surface 40*a* of the wide width portion 40A emit light in a substantially uniform manner.

In this embodiment, since the incident end surface 40*b* of the wide width portion 40A has a greater curvature than the incident end surface 40*b* of the narrow width portion 40B, the proportion of light reaching the end surfaces other than the emitting end surface 40*a* after entering from the incident end surface 40*b* of the wide width portion 40A is reduced. Further, light reaching such end surfaces is totally reflected at relatively large incident angles. As a result, most of the light emitted from the emitting end surface 40*a* of the light-transmitting member 40 can be made to travel in a direction close to the front-rear direction of the vehicle lamp 10. Consequently, the emitting end surface 40*a* of the wide width portion 40A also appears bright in a substantially uniform manner.

Therefore, in the vehicle lamp 10 including the light guide 30 which is elongated to define the longitudinal direction, and the light-transmitting member 40, the emitting end surface 40*a* can be made to emit light in a substantially uniform manner even when the width of the incident end surface 40*b* of the light-transmitting member 40 in the direction perpendicular to the longitudinal direction varies depending on the position in the longitudinal direction.

In the present embodiment, the wide width portion 40A is disposed upstream of the narrow width portion 40B in a direction in which light entering from the incident surface is guided.

The amount of light from the light guide 30 which enters the light-transmitting member 40 is relatively large on the upstream side in the light guiding direction. According to the above configuration, since the wide width portion 40A of the light-transmitting member 40 is disposed upstream of the narrow width portion 40B in the light guiding direction, the emitting end surface 40*a* of the wide width portion 40A can be made to appear bright in a substantially uniform manner with the same brightness as the emitting end surface 40*a* of the narrow width portion 40B.

In the present embodiment, the incident end surface 40*b* of the narrow width portion 40B of the light-transmitting member 40 is flat.

In the case where the incident end surface 40*b* of the light-transmitting member 40 is a convex curved surface, when the positions of the light-transmitting member 40 and the light guide 30 are displaced in a direction perpendicular to the longitudinal direction, it becomes difficult to control light distribution with the light-transmitting member 40 in a desired manner. In this case, even with the same displacement in width, the influence on the control of light distribution is larger in the narrow width portion 40B than in the wide width portion 40A.

However, by adopting a configuration in which the incident end surface 40*b* of the narrow width portion 40B is flat, even when a displacement of the light-transmitting member 40 and the light guide 30 occurs as described above, the influence on the control of light distribution can be suppressed effectively. In particular, since displacement easily occurs between the narrow width portion 40B located downstream in the light guiding direction and the light guide 30, it is effective to adopt such a configuration.

In the present embodiment, the light guide 30 extends such that its inclination angle with respect to the left-right direction of the vehicle changes. The wide width portion 40A is disposed at a position in which the inclination angle is larger.

When there is a displacement between the light-transmitting member 40 and the light guide 30 in the direction perpendicular to the longitudinal direction, the direction of the light emitted from the light-transmitting member 40 approaches a horizontal direction. Since the light distribution pattern formed by the vehicle lamp 10 generally diffuses more in the horizontal direction than in the vertical direction, the influence is relatively small even if a directional displacement of the emitted light occurs in the horizontal direction. Consequently, according to the above configuration, the influence on the light distribution of the vehicle lamp 10 can be suppressed.

In the present embodiment, the distance between the incident end surface 40*b* and the emitting end surface 40*a* is 1 to 5 times the width of the incident end surface 40*b* in the direction perpendicular to the longitudinal direction. That is, the distance L1, shown in FIG. 2A, is 1 to 5 times the width W1, and the distance L2, shown in FIG. 2B, is 1 to 5 times the width W2.

By making the distance between the incident end surface 40*b* and the emitting end surface 40*a* of the light-transmitting member 40 relatively short in this way, the light totally reflected by the inner surface 40*c* or the outer surface 40*d*, both being located between the incident end surface 40*b* and the emitting end surface 40*a* in the light-transmitting member 40, can be enabled to reach positions close to the inner surface 40*c* and the outer surface 40*d* around the emitting end face 40*a*. In this way, the entire emitting end surface 40*a* can be made to emit light in a substantially uniform manner. More preferably, the distance between the incident end surface 40*b* and the emitting end surface 40*a* is equal to or less than 3 times the width of the incident end surface 40b in the direction perpendicular to the longitudinal direction.

In the above embodiment, the light guide 30 has a circular cross-sectional shape in a direction perpendicular to the longitudinal direction. However, a configuration having another shape (e.g., a rectangle) may be also employed.

In the rear face portion of the light guide 30 in the above embodiment, there is provided a plurality of reflecting elements 30s recessed from the rear face portion. However, a configuration in which there is a plurality of reflecting elements 30s which protrude from the rear face portion can also be employed.

In the above embodiment, the cross-sectional shape of the light-transmitting member 40 in the direction perpendicular to the longitudinal direction is substantially rectangular, and the distance between the inner surface 40c and the outer surface 40d becomes slightly smaller as approaching from the incident end surface 40b to the emitting end surface 40a. However, other configurations (e.g., configurations in which the inner surface 40c and the outer surface 40d extend parallel to each other) may also be employed.

In the above embodiment, the emitting end surface 40a of the light-transmitting member 40 is flat. However, a configuration having another shape (e.g., a convex curved surface) may also be employed.

In the above embodiment, the vehicle lamp 10 is exemplified as a clearance lamp provided in the left front portion of the vehicle. However, not limited to a clearance lamp, the same effects can be obtained by employing the same configuration in a daytime-running lamp, a tail lamp, a stop lamp, a turn-signal lamp, a room lamp, and the like, regardless of the function and position in a vehicle.

Next, a modification of the above embodiment will be described.

Figure 3:
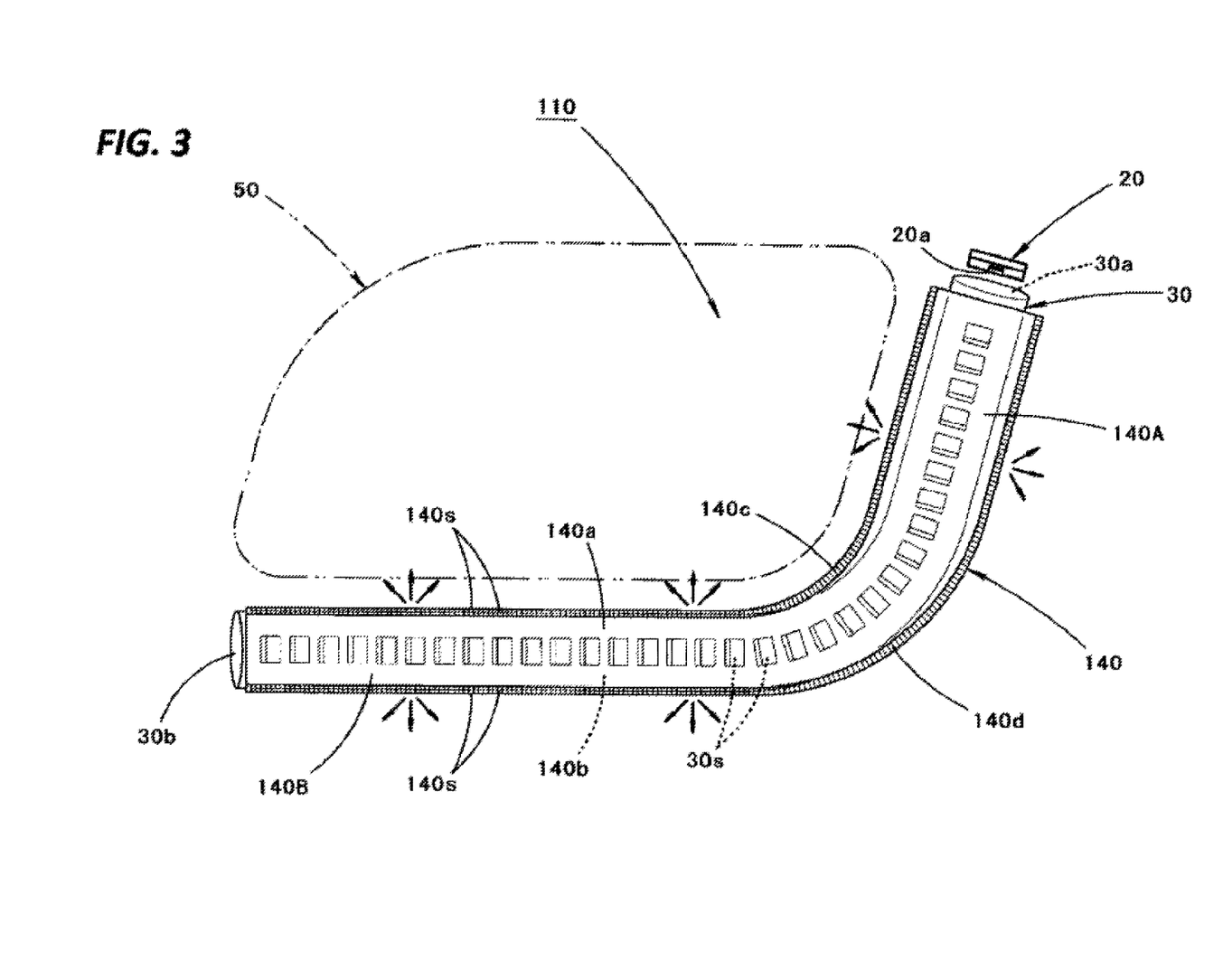
FIG. 3 is a view, similar to FIG. 1, illustrating a modification of the embodiment.
Figure 4A:
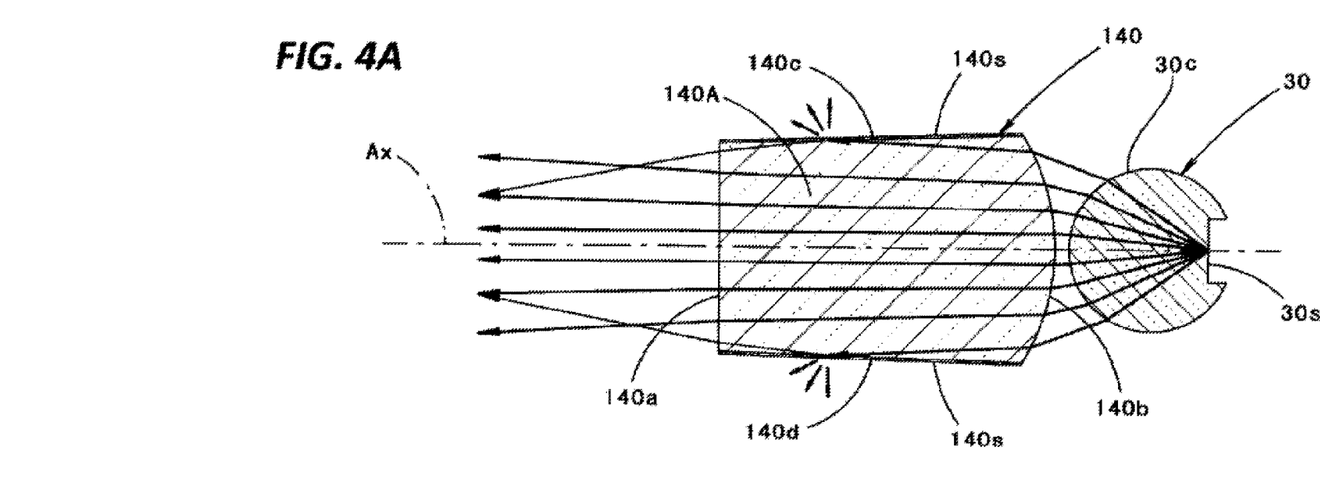
FIG. 4A is a view, similar to FIG. 2A, illustrating the modification.
Figure 4B:
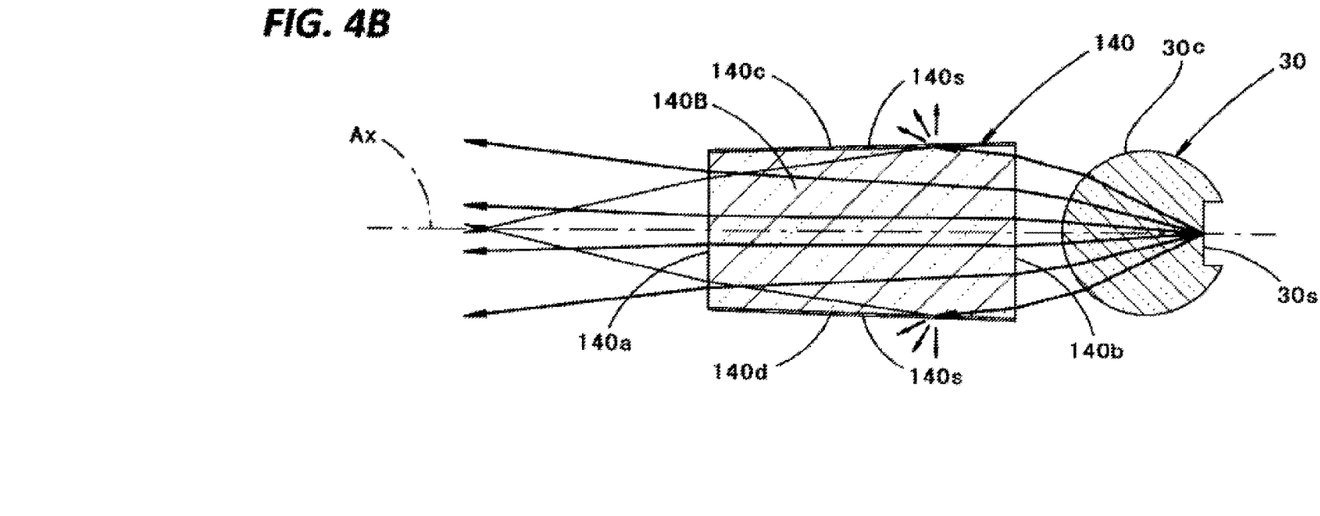
FIG. 4B is a view, similar to FIG. 2B, illustrating the modification.

FIGS. 3, 4A and 4B illustrate a vehicle lamp 110 according to the modification and are similar to FIGS. 1, 2A and 2B, respectively.

The basic configuration of the present modification is the same as that of the above embodiment except that the configuration of the light-transmitting member 140 is partially different.

Specifically, the light-transmitting member 140 of the present modification is applied with light diffusing treatment to the inner surface 140c and the outer surface 140d. Specifically, there are formed with knurling extending in the rearward direction (i.e. a plurality of protrusions) 140s (an example of a light diffusing portion).

By adopting the configuration of this modification, the following effects can be obtained.

In the light-transmitting member 140 of this modification, as in the case of the above embodiment, the curvature of the incident end surface 140b in the wide width portion 140A is larger than the curvature of the incident end surface 140b in the narrow width portion 140B. Accordingly, also in the wide width portion 140A, the proportion of light reaching the inner surface 140c and the outer surface 140d after entering from the incident end surface 140b can be reduced. Accordingly, the knurling 140s provided to the inner surface 140c and the outer surface 140d can suppress the effect of the light distribution to enhance the design (for example, in order to prevent the light guide 30 from being seen through the light-transmitting member 40).

In addition, since light diffusion treatment is performed by the knurling 140s, while a part of the light which has reached the inner surface 140c and the outer surface 140d is diffusely reflected in the longitudinal direction and emitted to the outside from the inner surface 140c and the outer surface 140d, light which is specularly reflected toward the front is also included. Accordingly, the specularly reflected light is effectively utilized as light emitted from the emitting end surface 140a.

In the above modification, light diffusion is made with knurling 140s.

However, other configurations (e.g., configurations in which embossing or frost treatment is performed) may also be employed.

It is noted that numerical values shown with elements in the above embodiment and its modified examples are only examples, and that these may appropriately set to different values.

The above embodiments are merely examples to facilitate understanding of the present disclosure. The embodiment described above can be modified or improved appropriately as long as it does not deviate from the spirit of the present disclosure.

As constituting part of the description of the present application, the contents of Japanese Patent Application No. 2015-154257 filed on Aug. 4, 2015 are incorporated herein by reference in its entirety.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A lamp to be mounted on a vehicle, the lamp comprising:
   a light source;
   a light guide having an incident surface and an emitting surface, and being elongated to define a longitudinal direction; and
   a light-transmitting member having an incident end surface and an emitting end surface, and extending along the longitudinal direction,
   wherein the light guide is arranged such that light emitted from the light source enters the incident surface,
   wherein the light guide is configured such that the light entering the incident surface is guided along the longitudinal direction and emitted from the emitting surface,
   wherein the light-transmitting member is arranged such that light emitted from the emitting surface of the light guide enters the incident end surface of the light-transmitting member,
   wherein the light-transmitting member is configured such that light which enters the incident end surface is emitted from the emitting end surface,
   wherein the light-transmitting member has a wide width portion and a narrow width portion,
   wherein a width of the incident end surface of the wide width portion is larger than a width of the light guide in a direction perpendicular to the longitudinal direction,
   wherein a width of the incident end surface of the narrow width portion is smaller than the width of the incident end surface of the wide width portion in the direction perpendicular to the longitudinal direction,
   wherein the incident end surface has a curved surface which is convex toward the light guide at least in the wide width portion, and wherein a curvature of the incident end surface in the wide width portion is greater than a curvature of the incident end surface in the narrow width portion.

2. The lamp according to claim 1,
wherein the wide width portion is disposed upstream of the narrow width portion in a direction in which light entering the incident surface is guided.

3. The lamp according to claim 1,
wherein the incident end surface of the narrow width portion is flat.

4. The lamp according to claim 1,
wherein the light-transmitting member has an end surface disposed between the incident end surface and the emitting end surface, and
wherein the end surface has a light diffusing portion.

5. The lamp according to claim 1,
wherein the light guide extends such that its inclination angle with respect to a left-right direction of the vehicle changes, and
wherein the wide width portion is disposed at a position in which the inclination angle is larger.

6. The lamp according to claim 1,
wherein a distance between the incident end surface and the emitting end surface is 1 to 5 times the width of the incident end surface in the direction perpendicular to the longitudinal direction.

\* \* \* \* \*